United States Patent [19]

Neumeyer

[11] Patent Number: 4,831,945
[45] Date of Patent: May 23, 1989

[54] OPENER ASSEMBLY WITH DEPTH GAUGING FROM A PRESS WHEEL

[75] Inventor: Lowell H. Neumeyer, Des Moines, Iowa

[73] Assignee: Deere & Company, Moline, Ill.

[21] Appl. No.: 125,501

[22] Filed: Nov. 25, 1987

[51] Int. Cl.$^4$ .......................... A01O 5/00; A01B 5/00
[52] U.S. Cl. ...................................... 111/73; 111/84; 172/176
[58] Field of Search ................ 111/6, 7, 73, 80, 84, 111/85; 172/176, 397, 462, 672, 705, 706

[56] References Cited

U.S. PATENT DOCUMENTS

| 4,311,104 | 1/1982 | Steilen et al. |
| 4,528,920 | 7/1985 | Neumeyer. |
| 4,579,071 | 4/1986 | Johnson ............................ 111/85 |
| 4,633,791 | 1/1987 | Lindstrom et al.. |

Primary Examiner—Brian S. Steinberger

[57] ABSTRACT

Relatively simple opener assembly structure for maintaining a generally constant vertical relationship between an opener and a trailing press wheel. The structure provides benefits of a parallel linkage design but obviates the extra links of, and provides better trash shedding and tripping characteristics than, a parallel linkage design. An opener arm and a press wheel arm are pivotally connected to a leg assembly for rocking about offset pivotal axes. As the press wheel arm oscillates over uneven ground, the opener arm is constrained for vertical movement with the central portion of a press wheel arm by a track and follower assembly. The opener arm is substantially shorter than the press wheel arm and causes the opener to rotate both rearwardly and upwardly upon encountering trash or other obstacles.

23 Claims, 3 Drawing Sheets

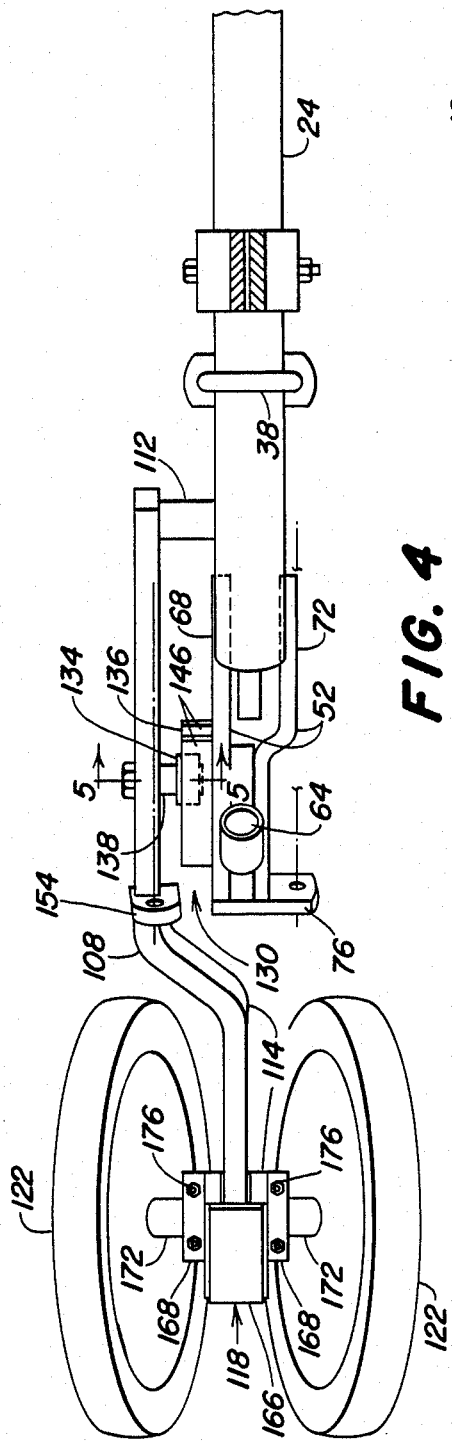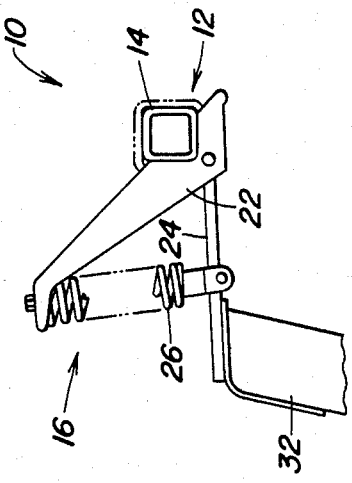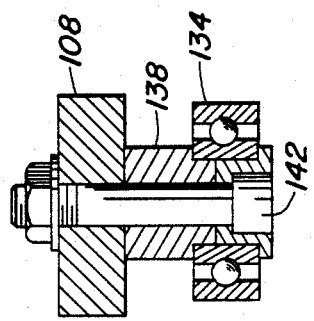

OPENER ASSEMBLY WITH DEPTH GAUGING FROM A PRESS WHEEL

BACKGROUND OF THE INVENTION

The present invention relates generally to agricultural seeding implements, and more specifically to an opener assembly for accurately placing seeds a predetermined distance below the surface of the ground.

Numerous types of furrow opener assemblies are available for use with a grain drill or similar implement to place seed in a furrow below the surface of the ground. Some systems are relatively simple and use an opener tool connected to a pivotable press wheel arm so that the tool moves up and down with the press wheel. Such fixed systems have the disadvantage that the vertical relationship between the opener tool and the press wheel will change as the press wheel arm oscillates. Other designs, such as parallel linkage openers, are more complicated and expensive to fabricate, and the numerous pivots subject to wear can cause unwanted looseness in the system. Because a parallel linkage moves an opener vertically without rotation, trash shedding capability and durability in soils where rocks or other obstructions are present are usually much less than optimum.

BRIEF DESCRIPTION OF THE INVENTION

It is therefore an object of the present invention to provide an improved furrow opener assembly for a grain drill or the like which accurately places seeds a predetermined distance below the surface of the ground even when the soil surface is irregular. It is a further object to provide such an opener assembly which is relatively simple in construction and yet which more accurately places seed than opener systems utilizing an opener tool fixed to a press wheel arm. It is yet a further object of the invention to provide such a furrow opener assembly which provides many of the benefits of a parallel linkage opener but which is simpler in construction and easier to assemble than the parallel linkage opener and which provides better trash shedding capability and greater durability in rocky soils.

It is still another object of the present invention to provide an improved furrow opener assembly which is accurately gauged by a press wheel assembly as the press wheel assembly maneuvers over uneven ground. It is a further object to provide such an assembly which maintains a relatively constant vertical relationship between the opener tool and the press wheel as the press wheel arm oscillates. It is another object to provide such an assembly which automatically provides slight planting depth variations for optimizing seeding depth in differing ground conditions. It is still another object to provide opener structure which permits easy changeover from one opener style to another.

It is still a further object of the present invention to provide an improved combination seeding and fertilizer opener assembly which is relatively simple and inexpensive in construction, which accurately places seeds a predetermined distance below the surface of the ground even in varying soil conditions and relatively rough ground conditions, and which provides improved trash shedding and increased durability in rocky soils over previously available combination seeding and fertilizer opener assemblies. It is a further object to provide such an assembly which has advantages of a parallel linkage design opener but with less links and pivots than such an opener. It is still a further object to provide such an assembly which maintains a relatively constant planting depth even with variations in fertilizer opener depth In accordance with the above objects, a combination seeding and fertilizer opener assembly is provided including a tool-supporting leg assembly connected by a spring trip shank assembly to the frame of an agricultural implement such as a grain drill. A deep banding fertilizer knife is connected to the lower end of the leg assembly. A seed opener assembly includes an opener arm extending rearwardly from a pivotal connection with the leg assembly to a connection with an opener tool which extends downwardly from the aft end of the arm and supports a split row opener. A press wheel assembly including a trailing press wheel arm is pivotally connected above the opener arm to the leg assembly and extends rearwardly therefrom to a connection with vertically adjustable depth gauging rear press wheels adapted for firming the soil over the seed deposited by the opener. A mating track and follower assembly located on the arms maintains a preselected vertical relationship between the opener and the press wheel as the opener and press wheel arms rock about their respective pivotal connections with the tool support. The track and follower assembly includes a channel-shaped member fixed to one of the arms, and a roller or similar member fixed to the other of the arms and seated within the channel-shaped member for constraining the opener arm to move synchronously with the central portion of the press wheel arm. The track and follower assembly work together to cause the arm to rotate in such a manner to maintain a relatively constant vertical relationship between the seed opener and the gauging press wheels as the assembly maneuvers over uneven ground. Down pressure springs are connected to both the opener assembly and the press wheel assembly, and slight vertical play is provided between the track and follower components to cause the depth of penetration of the opener to increase slightly in loose, dry soil and to decrease slightly in heavier, damper soils The benefits of a parallel linkage opener are achieved without the use of extra links. Much of the simplicity of a system wherein the opener tool is fixed to a pivotal press wheel arm is maintained without the disadvantages of a variable vertical relationship between the opener tool and the press wheel as the press wheel arm oscillates vertically. The opener depth may be easily adjusted by adjusting the press wheels vertically.

The opener arm is relatively short compared to the length of the trailing press wheel arm, and therefore the opener rotates up and rearwardly more advantageously to shed trash and prevent damage by rocks. The track and follower assembly configuration amplifies opener arm movement and provides a relatively constant vertical relationship between the gauge wheels and the seed opener for a given ground condition despite the difference between opener and press wheel arm lengths.

These and other objects, features and advantages of the present invention will become apparent to those skilled in the art from the description which follows and from the drawings.

BRIEF DESCRIPTION OF THE DRAWINGS

FIG. 4 is a top view of the assembly of FIG. 1.

FIG. 5 is a sectional view of the roller taken generally along lines 5—5 of FIG. 4.

FIG. 6 is a perspective view of a portion of a grain drill with the opener assembly of the present invention attached thereto.

DESCRIPTION OF THE PREFERRED EMBODIMENT

Figure 1:
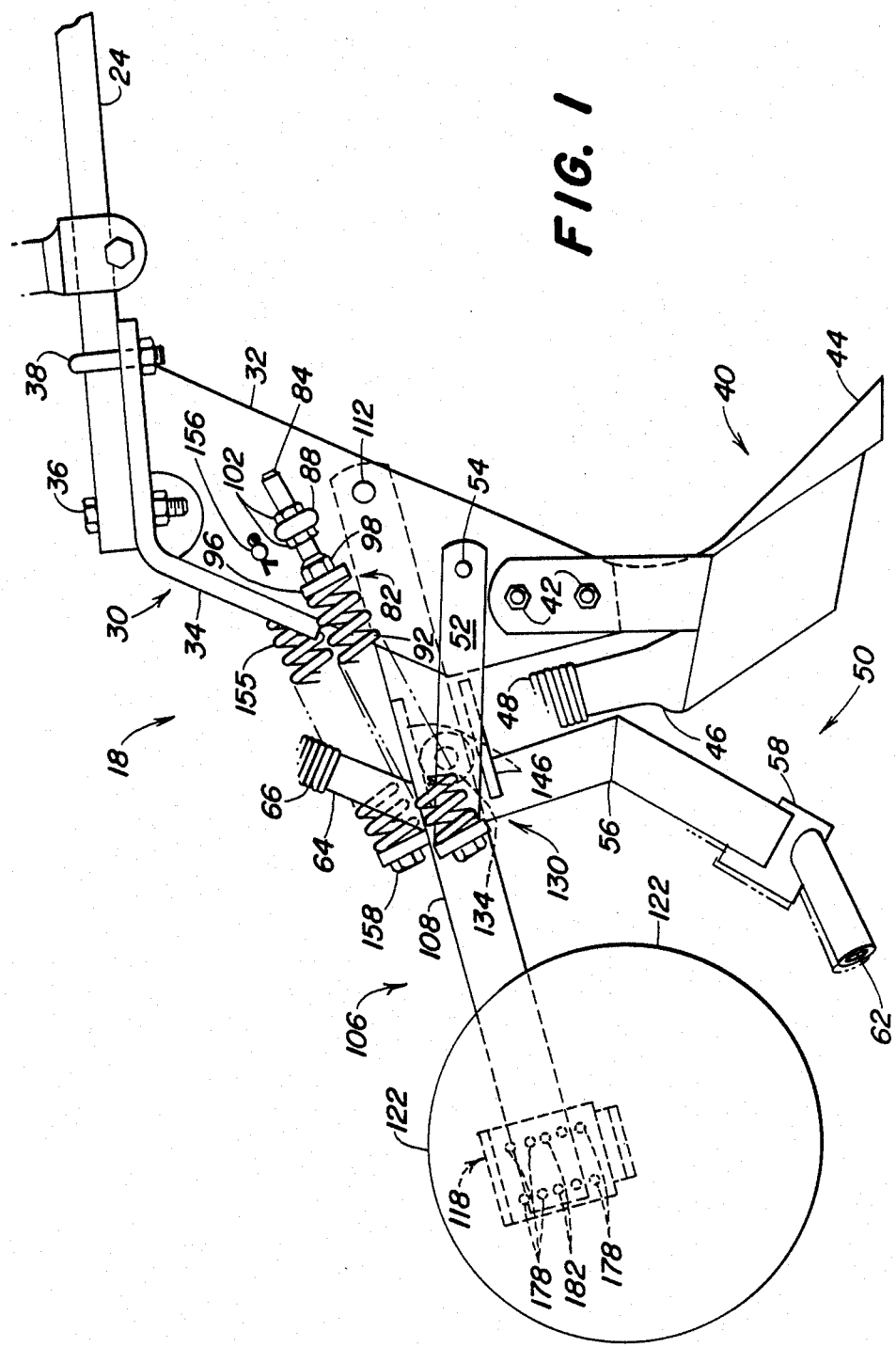
FIG. 1 is a side view of the opener assembly of the present invention.
Figure 2:
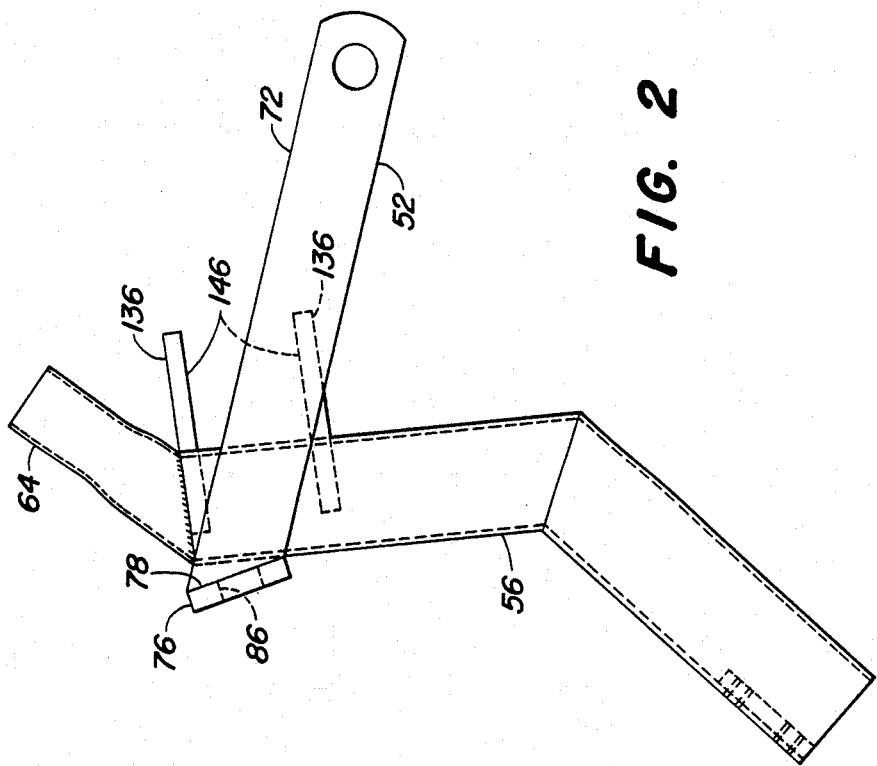
FIG. 2 is a side view of the seed opener of the assembly of FIG. 1.
Figure 3:
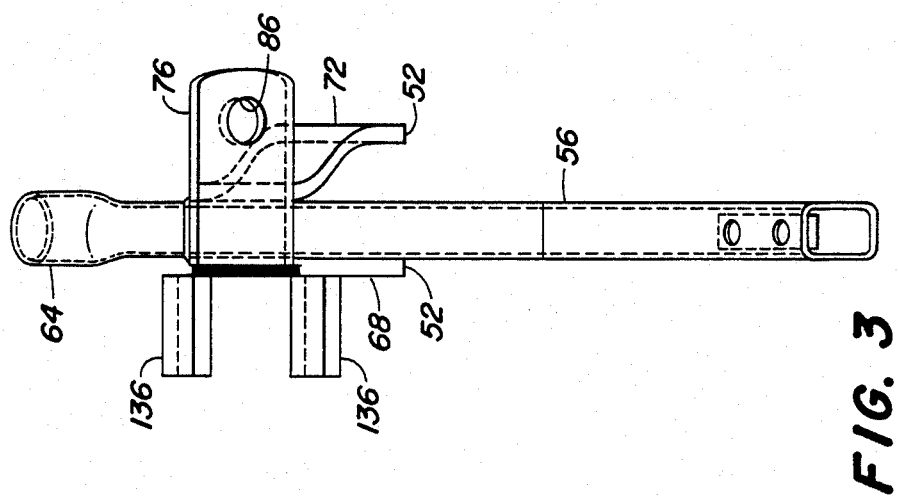
FIG. 3 is a rear view of the opener of FIG. 2.

Referring to FIGS. 1 and 6, there is shown a grain drill 10 or similar implement having a main frame 12 supported for forward movement over the ground by a towing vehicle (not shown). The frame 12 includes a transversely extending beam or toolbar 14 supporting a plurality of transversely spaced spring trip shank assemblies 16. Each spring trip shank assembly 16 supports an opener assembly 18 adapted for depositing material such as seed and/or fertilizer in the soil.

The spring trip shank assembly includes a bracket 22 connected to and extending rearwardly and upwardly from the beam 14. A straight shank section 24 is pivotally connected at its forward end to the bracket 22 below the beam 14. A conventional coil spring and tension link assembly 26 connected between the upper end of the bracket 22 and the central portion of the shank section 24 biases the shank section downwardly about the pivotal connection with the bracket 22 and prevents the aft end of the shank from dropping below a preselected position in transport.

A leg assembly 30 includes a downwardly and rearwardly extending upright support plate 32 having an angle 34 welded to the upper end thereof. The leg assembly 30 is connected to the aft end of the shank section 24 by a bolt 36 and a U-bolt 38 extending through the upper end of the angle 34. A deep banding fertilizer knife assembly 40 is connected by bolts 42 to the lower end of the leg assembly 30. The assembly 40 includes a knife 44 adapted for opening a slit within the soil a substantial distance below the surface of the ground. A fertilizer tube 46 connected to a fertilizer hose 48 is supported behind the knife for depositing fertilizer within the slit opened by the knife.

A seed opener assembly indicated generally at 50 includes an opener arm 52 having a forward end connected by pivot structure 54 to the lower end of the support plate 32 just above the knife assembly 40 for rocking about a transverse horizontal axis. The opener arm 52 includes an aft end fixed to an upright seed tube assembly 56. The lower end of the seed tube assembly 56 is connected to a split row shoe 58 having spaced seed outlets 62 adapted for depositing seed in parallel rows beneath the surface of the ground generally above and on either side of the fertilizer placed in the soil by the knife assembly 40. The seed tube assembly 56 has an upper inlet 64 for receiving seed from a conventional seed hose 66. The opener arm 52 preferably includes a pair of straps 68, 72 fixed to either side of the upper end of the seed tube assembly 56 and extending forwardly therefrom to opposite sides of the support plate 32. The pivot structure 54 extends through the plate 32 for pivotally supporting the forward ends of the strap 68, 72. A bracket 76 is welded to and spaces the aft ends of the straps 68, 72 and includes a forwardly directed, spring abutting surface 78. An adjustable down pressure spring assembly 82 is connected between the bracket 76 and the upper end of the support plate 32. The spring assembly 82 includes a threaded rod 84 extending through an aperture 86 in the bracket 76 and supported at its opposite end by a pivot 88 carried by the support plate 32. The bracket 76 is slidable over the headed end of the rod 84 and the surface 78 abuts against the aft end of a compression spring 92 which is compressed between the bracket 76 and a washer 96 adjustably supported on the threaded end of the rod 84 by a nut 98. The threaded rod 84 acts as a tension link to prevent the opener assembly 50 from pivoting downwardly beyond a preselected position relative to the leg assembly 30. Nuts 102 are provided on either side of the pivot 88 for adjustment on the threaded rod 84 to adjust the length of the rod between the pivot and the headed end.

A press wheel assembly 106 is provided for firming the soil over the seed deposited by the split row shoe 58 and for gauging the depth of the shoe. The press wheel assembly 106 includes a press wheel arm 108 having a forward end pivotally connected to the support plate 32 by a pivot assembly 112. The pivot assembly 112 extends transversely (FIG. 4) from the support plate 32 at a location forwardly and above the pivot structure 54 which connects the opener arm 52 to the leg assembly 30. The pivot assembly 112 supports the press wheel arm 108 outwardly adjacent the strap 68 of the opener arm 52. The press wheel arm 108 extends rearwardly to a location adjacent the aft end of the seed tube assembly 56 where the arm 108 angles inwardly to a location 114 generally aligned in the fore-and-aft direction with the opener arm 52. From the location 114 the arm extends rearwardly to an aft end supporting a vertically adjustable press wheel bracket 118. Press wheels 122 are mounted on either side of the bracket 118 for firming the soil over the seeds deposited by the split row shoe 58.

As best seen in FIG. 1, the aft end of the seed opener arm 2 lies closely adjacent a central portion of the press wheel arm 108. A track and follower arrangement 130 is provided on the arms 52 and 108 for constraining the aft end of the opener arm 52 for rocking with the central portion of the wheel arm 108 to maintain a generally constant preset vertical relationship between the opener shoe 58 and the press wheels as the press wheel arm rocks about the pivotal axis of the pivot assembly 112.

The track and follower arrangement as shown in FIGS. 1 and 4 includes a roller 134 connected to the central portion of the press wheel arm 108. A track 136 is connected to the opener arm and defines therewith a channel-shaped member opening toward and receiving the roller 134. The roller 134 is a ball bearing connected in cantilever fashion to the arm 108. As shown in FIG. 5, a bushing assembly 138 is clamped to the inner race of the bearing and is connected by a bolt 142 to the arm 108. Alternately, a needle bearing and stud assembly may be utilized. The track 136 as shown includes a pair of transversely spaced plates 146 welded to the strap 68 and to the side of the seed tube assembly 56. The plates 146 run generally parallel to each other and are angled upwardly in the forward direction from the longitudinal axis of the opener arm 52. The plates 146 are sufficiently elongated in the fore-and-aft direction to maintain the roller 134 within the track 136 over a substantial range of pivoting the press wheel arm 108. As the press wheel arm rocks up and down the track and follower arrangement 130 constrains the aft end of the opener arm 52 for movement with the central portion of the press wheel arm 108. The outer race of the bearing 134 is free to roll within the track 136 during pivoting. As can best be seen in FIG. 1, the track 136 amplifies the movement of the seed opener assembly 50 to provide a relatively constant vertical relationship between the press wheels 122 and the shoe 58.

As shown in FIG. 1 the roller 134 has an outer diameter slightly less than the spacing between the plates 146 so that the depth of penetration of the seed opener assembly 50 will increase slightly in loose, dry soil and decrease slightly in heavier, damper soil. With the increased draft in heavy soil, the lower plate 146 will stop against the bottom of the roller 134 and the shoe 58 will penetrate the soil less (see the broken lines of FIG. 1) than in looser, drier conditions (solid lines of FIG. 1) wherein the upper plate bottoms against the top of the roller 134. Preferably, the outer diameter of the roller 134 is approximately 0.2 inches less than the spacing between the plates 146.

To help maintain the press wheels 122 in ground contact, an additional down pressure spring assembly 152 similar to the assembly 82 is connected between the press wheel arm 108 and the support plate 32 on the side of the opener assembly opposite that of the assembly 82. A bracket 154 is welded to and extends upwardly from the press wheel arm 108 forwardly of the bend location 114. A compression spring 155 is mounted between the bracket 154 and a pivotal connection 156 with the support plate 32. A tension link 158 extends through the bracket 154 and is connected to the pivot 156. An adjusting nut (not shown) similar to that shown for the assembly 82 adjustably compresses the spring against the bracket 154. Utilizing the two down pressure spring assemblies 82 and 152 eliminates the need for one large, bulky spring and permits the operator to remove the seed opener assembly 50 and utilize a conventional opener or the like at the lower end of the leg assembly 30 in place of the deep banding knife assembly 40 while still retaining press wheel down pressure. The separate springs also facilitate the automatic depth variation of the opener assembly 50 with the spring 155 biasing the assembly downwardly to contact the upper plate 146 against the roller 134 in loose soil. In heavier soils, the roller 134 contacts the lower plate 146, and both springs 92 and 155 work together to bias the opener assembly 50 downwardly into the ground engaging position.

As best seen in FIG. 4, the press wheel bracket 118 includes a box weldment 166 which fits over the aft end of the press wheel arm 108. Outwardly directed flanges 168 at the lower end of the saddle member 166 support axle structure 172 which rotatably mounts the press wheels 122. As shown, the axle structure 172 is connected by a pair of U-bolts 176 to the respective flanges 168. The box weldment 166 includes a plurality of vertically spaced apertures 178 (FIG. 1) adapted for alignment with a pair of holes 182 in the press wheel arm 108. To set the desired working depth of the split row shoe 58, the holes 182 are aligned with the preselected set of apertures 178 in the saddle member 166, and pin structure (not shown) is inserted through the apertures 178 and holes 182 to fix the location of the axle structure 172 relative to the aft end of the press wheel arm 108.

As can be seen from FIG. 1, the opener arm 52 is substantially shorter than the press wheel arm 108, and therefore upward rocking of the seed tube assembly 56 with movement of the press wheel arm 108 results in a rearward and upward rotation of the split row shoe 58. If a large obstacle such as a rock is encountered, the seed tube assembly 56 can more easily clear the obstacle because of the rearward and upward rotation. The geometry of the structure as shown in FIG. 1 provides a relatively constant vertical relationship between the press wheels 122 and the shoe 58 at normal fieldworking depths of the opener assembly 18 for a given soil condition. Proper seeding depth is maintained even with variations in the depth of the fertilizer knife 44 as soil conditions and contours change.

To increase the depth of the shoe 58, the operator simply removes the pin structure from the apertures 178 and holes 182 and moves the box weldment 166 upwardly to raise the press wheels 122 relative to the aft end of the press wheel arm 108. A new set of apertures 178 are aligned with the holes 182 in the press wheel arm and the pin structure is reinserted to secure the press wheels in the readjusted position. To decrease planting depth, the press wheels are lowered relative to the aft end of the arm 108.

To change the opener assembly 18 to a more conventional opening arrangement, the operator simply removes the deep banding fertilizer knife assembly 40 from the lower end of the support plate 32 and attaches a conventional opener, such as a wedge opener or a hoe opener, to the support plate. The seed opener assembly 50 is removed, and the box weldment 166 is removed to disconnect the double press wheel arrangement 122. A single press wheel can then be bolted to one of the apertures in the aft end of the press wheel arm so that the single press wheel is generally aligned with the support plate 32. The seed hose 66 is then connected to the seed receiving structure on the wedge or hoe opener.

Having described the preferred embodiment, it will be apparent that modifications can be made without departing from the scope of the invention as defined in the accompanying claims.

I claim:

1. For an implement having a frame adapted for towing forwardly over the ground, an opener assembly comprising:
    a tool support adapted for connection to the frame;
    a trailing wheel arm having an aft end rotatably supporting a ground engaging wheel, a forward end, and a central portion located between the ends;
    means pivotally connecting the forward end of the wheel arm to the tool support for rocking vertically about a first pivotal axis;
    a trailing opener arm having an aft end fixedly supporting an opener thereon, and forward end;
    means pivotally connecting the forward end of the opener arm to the tool support for rocking vertically about a second pivotal axis offset from the first pivotal axis;
    means biasing the wheel arm downwardly about the first pivotal axis for maintaining the wheel in ground engagement as the implement moves over varying ground contour; and
    means for maintaining a preset vertical relationship between the opener and the wheel as the wheel arm rocks about the first pivotal axis including a guide and follower assembly connected to the wheel arm and the opener arm constraining the wheel arm and the opener arm for rocking together about the first and second pivotal axes, respectively.

2. The invention as set forth in claim 1 wherein the guide and follower assembly includes a track connected to the central portion of the wheel arm.

3. The invention as set forth in claim 2 wherein the guide and follower assembly further includes a roller connected to the opener arm for maintaining the opener arm at a preselected vertical position relative to the wheel arm.

4. The invention as set forth in claim 3 wherein the opener arm is substantially shorter than the wheel arm.

5. The invention as set forth in claim 4 wherein the second pivotal axis is located below the first pivotal axis and the guide and follower assembly constrains the aft end of the opener arm for rocking in unison with the central portion of the wheel arm.

6. The invention as set forth in claim 1 further comprising a second opener connected to and extending downwardly from the tool support forwardly adjacent the first-mentioned opener.

7. The invention as set forth in claim 6 including means for resiliently biasing the tool support downwardly relative to the frame for yieldingly maintaining the ground engaging tool in the ground.

8. The invention as set forth in claim 1 further comprising spring means connected between the tool support and the opener arm for biasing the opener arm downwardly.

9. For an implement having a frame adapted for towing forwardly over the ground, an opener assembly comprising:
a tool support adapted for connection to the frame;
a trailing wheel arm having an aft end rotatably supporting a ground engaging wheel for rotation about a horizontal axis, a forward end, and a central portion located between the ends;
means pivotally connecting the forward end of the wheel arm to the tool support for rocking about a first pivotal axis;
a trailing opener arm having an aft end fixedly supporting an opener thereon, and a forward end;
means pivotally connecting the forward end of the opener arm to the tool support for rocking about a second pivotal axis offset from the first pivotal axis;
means biasing the wheel arm downwardly about the first pivotal axis for maintaining the wheel in ground engagement as the implement moves over varying ground contour; and
means for maintaining a preset vertical relationship between the opener and the wheel as the wheel arm rocks about the first pivotal axis, wherein the means for maintaining a preset vertical relationship includes a track and follower assembly connected to the opener arm and to a portion of the wheel arm for maintaining the opener arm at a preselected vertical position relative to the wheel arm and wherein the track and follower assembly includes a fore-and-aft extending roller receiving track connected to the aft end of the opener arm and a roller connected to the wheel arm and supported by the track, said track being angled from the horizontal to increase the vertical movement of the opener arm relative to the roller as the wheel arm and the opener arm pivot.

10. In an implement having a frame adapted for towing forwardly over the ground, a combination seeding and fertilizing opener assembly comprising:
a tool support connected to the frame;
a fertilizer tool connected to the tool support for applying fertilizer beneath the surface of the ground;
an opener arm having a forward end pivotally connected to the tool support, an aft end, and a furrow opener fixed to the aft end of the opener arm and extending downwardly therefrom for forming a furrow in the ground and depositing seed therein behind the fertilizer tool;
a press wheel assembly for firming the soil over the deposited seed and for gauging the depth of the opener, said press wheel comprising a press wheel arm having a forward end pivotally connected to the tool support, an aft end rotatably supporting a press wheel rearwardly of the opener, and a central portion located between the ends; and
means for maintaining a preset vertical relationship between the opener and the press wheel as the opener arm and the press wheel arm rock about the respective pivotal connections with the tool support including means for constraining the aft end of the opener arm for rocking with the central portion of the press wheel arm.

11. The invention as set forth in claim 18 wherein the opener arm is substantially shorter than the press wheel arm.

12. The invention as set forth in claim 10 wherein the means for constraining the aft end of the opener arm includes a guide member connected to the press wheel arm and follower means connected to the opener arm and constrained for movement along the guide member as the press wheel arm rocks.

13. The invention set forth in claim 10 further including first spring means connected between the tool support and the press wheel arm and second spring means connected between the tool support and the opener arm.

14. The invention as set forth in claim 13 wherein the means for constraining the aft end of the opener arm includes means for causing the preselected vertical position to automatically vary with changing soil conditions to thereby vary depth of penetration of the furrow opener in the ground with the changing soil conditions.

15. The invention as set forth in claim 10 wherein the fertilizer tool comprises a fertilizer knife, said assembly further including a spring trip shank assembly connected between the frame and the tool support and resiliently biasing the knife into a ground engaging position.

16. In an implement having a frame adapted for towing forwardly over the ground, a combination seeding and fertilizing opener assembly comprising:
a tool support connected to the frame;
a fertilizer tool connected to the tool support for applying fertilizer beneath the surface of the ground;
an opener arm having a forward end pivotally connected to the tool support, an aft end, and a furrow opener fixed to the aft end of the opener arm and extending downwardly therefrom for forming a furrow in the ground and depositing seed therein behind the fertilizer tool;
a press wheel assembly for firming the soil over the deposited seed and for gauging the depth of the opener, said press wheel comprising a press wheel arm having a forward end pivotally connected to the tool support, an aft end rotatably supporting a press wheel rearwardly of the opener, and a central portion located between the ends; and
means for maintaining a preset vertical relationship between the opener and the press wheel as the opener arm and the press wheel arm rock about the respective pivotal connections with the tool support including means for constraining the aft end of the opener arm for rocking with the central portion of the press wheel arm wherein the means for constraining the aft end of the opener arm includes a guide member connected to the press wheel arm and follower means connected to the opener arm and constrained for movement along the guide member as the press wheel arm rocks, and wherein the guide member comprises a roller and the follower means comprises a track connected to the opener arm for receiving the roller.

17. The invention as set forth in claim 10 including bracket means for adjusting the press wheel vertically relative to the aft end of the press wheel arm to thereby adjust the depth of penetration of the furrow opener.

18. An opener assembly for depositing material in the ground, comprising:
   a leg assembly;
   a vertically rockable press wheel arm having a first end pivotally connected to the leg assembly and extending rearwardly there from to a second end, and a ground-engaging press wheel supported from the second end;
   an opener arm having a forward end pivotally connected to the leg assembly and extending rearwardly therefrom to an intermediate portion adjacent the press wheel arm at a preselected location on the arm forwardly of the second end, and a lower ground-engaging portion adapted for depositing material below the surface of the ground;
   guide and follower means including a first mating member located at the preselected location on the press wheel arm and a mating second member located adjacent the intermediate portion of the opener arm, said guide and follower means constraining the ground engaging portion for rocking with the press wheel arm for controlling depth of penetration of the ground-engaging portion; and
   wherein the first mating member and the second mating member roller supported by the track.

19. The invention as set forth in claim 18 wherein the track comprises two plates vertically spaced on one of the arms and wherein the roller is connected to the other of the arms and is contained between the plates.

20. The invention as set forth in claim 18 wherein the first and mating members include means for causing the ground-engaging portion to rock vertically a limited distance relative to the press wheel arm with changing soil conditions to thereby vary the depth of penetration with the changing soil conditions.

21. The invention as set forth in claim 20 including first and second down pressure means for biasing the press wheel arm and opener arm, respectively, toward ground-engaging positions.

22. The invention as set forth in claim 19 wherein the diameter of the roller is substantially less than the spacing between the plates, and means for causing the roller to rock between the plates in changing soil conditions.

23. The invention as set forth in claim 18 wherein the opener arm is substantially shorter than the press wheel arm and the guide and follower means includes means for increasing the vertical movement of the ground-engaging portion relative to the vertical movement of the preselected location on the press wheel arm.

* * * * *

UNITED STATES PATENT AND TRADEMARK OFFICE
CERTIFICATE OF CORRECTION

PATENT NO.  :   4,831,945
DATED       :   23 May 1989
INVENTOR(S) :   Lowell H. Neumeyer It is certified that error appears in the above-identified patent and that said Letters Patent is hereby corrected as shown below:

Column 8, line 17, change "18" to -- 10 --.

Column 10, line 6, after "member" insert -- comprise a track, and a --.

Signed and Sealed this

Nineteenth Day of March, 1991

Attest:

HARRY F. MANBECK, JR.

*Attesting Officer*    *Commissioner of Patents and Trademarks*